(12) United States Patent
Chen

(10) Patent No.: US 8,132,670 B1
(45) Date of Patent: Mar. 13, 2012

(54) PROTECTIVE COVER FOR PORTABLE ELECTRONIC DEVICES

(75) Inventor: Stephen Chen, Changhua (TW)

(73) Assignee: E-Lead Electronics Co., Ltd., Changhua (TW)

( * ) Notice: Subject to any disclaimer, the term of this patent is extended or adjusted under 35 U.S.C. 154(b) by 0 days.

(21) Appl. No.: 13/064,281

(22) Filed: Mar. 16, 2011

(51) Int. Cl.
*B65D 85/00* (2006.01)
(52) U.S. Cl. ..................... 206/320; 206/45.24
(58) Field of Classification Search ............... 206/45.2, 206/45.21, 45.23–45.26, 45.28, 320, 751, 206/755, 762, 764, 766; 150/165
See application file for complete search history.

(56) References Cited

U.S. PATENT DOCUMENTS

| 5,165,649 | A * | 11/1992 | Neumann et al. | 206/45.26 |
| 5,887,723 | A * | 3/1999 | Myles et al. | 206/320 |
| 6,772,879 | B1 * | 8/2004 | Domotor | 206/320 |
| 7,735,644 | B2 * | 6/2010 | Sirichai et al. | 206/320 |
| 2002/0112975 | A1 * | 8/2002 | Lin | 206/762 |
| 2011/0266176 | A1 * | 11/2011 | Still | 206/320 |
| 2011/0290686 | A1 * | 12/2011 | Huang | 206/320 |
| 2011/0290687 | A1 * | 12/2011 | Han | 206/320 |

* cited by examiner

*Primary Examiner* — Luan K Bui
(74) *Attorney, Agent, or Firm* — Guice Patents PLLC

(57) ABSTRACT

A protective cover for portable electronic device includes a front lid and a rear lid coupled together. The front lid has an inner side contained a holding means to hold the body of an electronic device. The front lid has an outer side with a first fastening element located thereon. The rear lid has an inner surface holding at least one support leg and an outer surface with a second fastening element located thereon. When in use the front lid can be flipped outwards for 360 degrees and coupled through the first and second fastening elements. The support leg can be expanded to facilitate user's viewing of the screen.

9 Claims, 9 Drawing Sheets

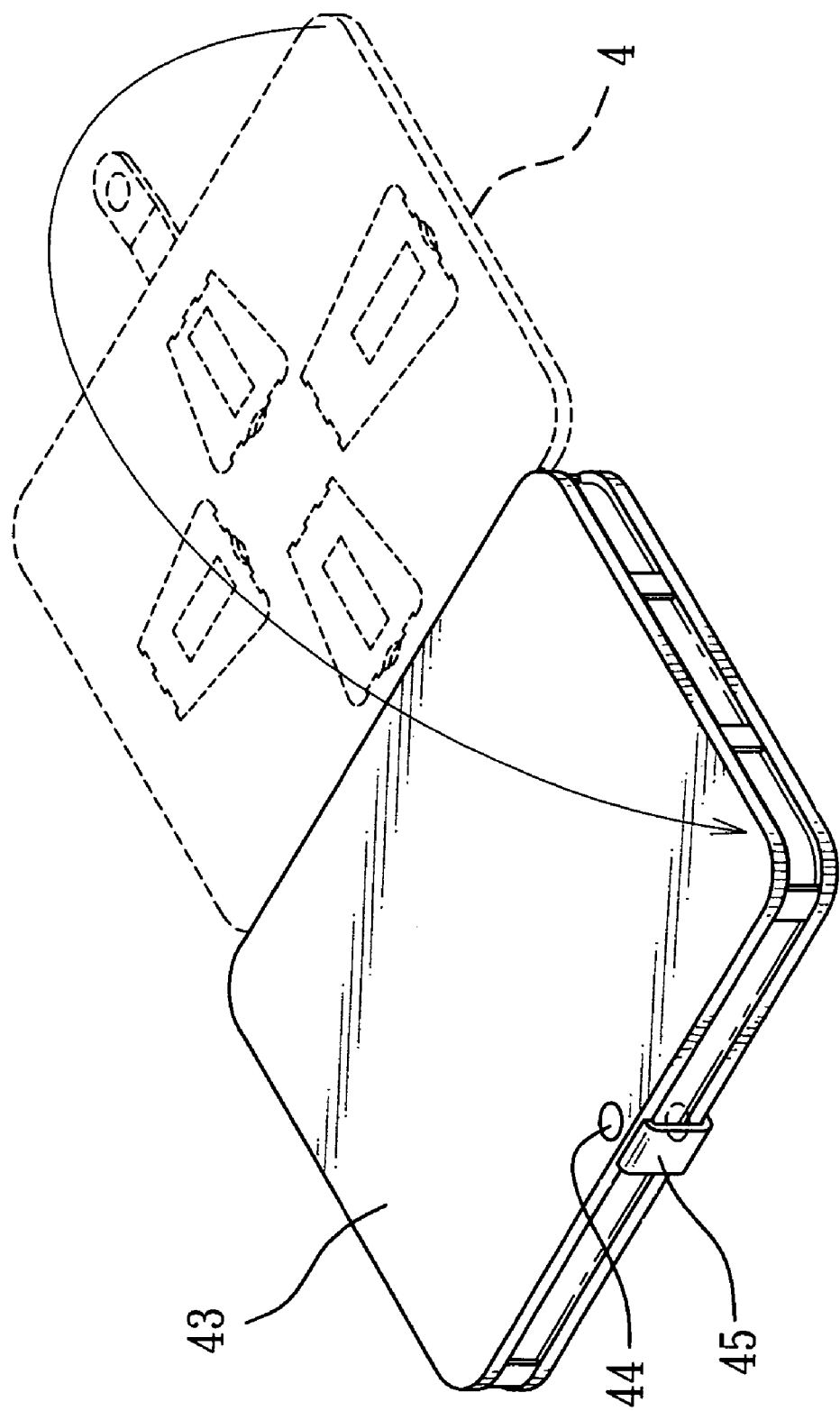

PROTECTIVE COVER FOR PORTABLE ELECTRONIC DEVICES

BACKGROUND OF THE INVENTION

1. Field of the Invention

The present invention relates to a protective cover for portable electronic devices and particularly to a handy protective cover for a portable electronic device to protect the surface of the portable electronic device and support its weight when in use to alleviate user's burden on arms.

2. Description of the Prior Art

Computers have advanced greatly in recent years, evolving from a bulky set housed in a computer room to become personal computers and notebook computers, and now evolve into touch control portable electronic devices, such as smart phones, tablet computers, smart handsets and the like. The portable electronic device adopts the technique of touch screen that allows users to directly select targeted items intuitively on the computer screen, and zoom icons or texts larger or smaller on the screen by splaying or closing two fingers. Such direct selection operation on the screen brings the users closer to the screen. It is much more straightforward and handy than the conventional technique that has a keyboard intervened between the computer user and the screen. Moreover, with the portable electronic device formed in a single slat structure, users can flexibly operate and maneuver by touching on the screen.

While the portable electronic device usually is simply structured and very neat in profile, and often creates a great appeal to the users, its surface is prone to be scraped or smeared and results in an undesirable aesthetic appearance. To remedy this problem, a protective cover 11 (referring to FIG. 1) made from various types of materials has been developed and introduced on the market. The protective cover 11 usually covers the back side of an electronic device 12 and has a carved out portion 111 to expose the screen to facilitate operation. The protective cover aims to protect the surface of the device to maintain the aesthetic appeal. However, many portable electronic devices are formed in an one slate structure without an extra support means, such as the tablet computer which usually is formed in a larger size. When in use a user has to hold and bear the weight of the computer with one hand and perform operation with another hand, or has to raise the display screen in a standing manner with one palm to see the screen at an optimal angle even if it is rested on a table or user's lap. Such an approach is inconvenient and troublesome, and easily causes physical fatigue on user's arms when used in a prolonged duration. Moreover, the portable electronic device, aside from being operated with two hands, also has to be held firmly by the hands to prevent dropping. This also tends to cause fatigue on the hands in a long duration. In addition, the portable electronic device 12 is mostly designed with a streamline and smooth profile to enhance aesthetic appeal, that makes hand holding even more difficult.

Furthermore, the general tablet computer is mainly designed for users to use in a handheld manner, given a common ten inches screen, the dimension of the tablet computer usually is 18 cm×24 cm, and weighs at least 500 g. With the user holding one side of the computer with one hand and operating the touch screen with another hand, the hand that grasps the screen has to bear the weight of the computer, but the gravity center of the computer is not on the hand grasping portion, and a levering force caused by the gravity force has to be born by the hand also. This increases the load of the hand and reduces the sustainable time of the hand, and also increases the fatigue and burden of user's hands and arms.

SUMMARY OF THE INVENTION

In view of the aforesaid conventional disadvantages, it is an object of the present invention to provide a protective cover for portable electronic devices that is portable and handy and can protect the surface of a portable electronic device and support the weight thereof when in use to alleviate the burden of user's arms.

To achieve the foregoing object, the protective cover according to invention includes a front lid and a rear lid coupled together. The front lid has an inner side contained a holding means to hold the body of the electronic device. The front lid has an outer side with a first fastening element located thereon. The rear lid has an inner surface holding at least one support leg and an outer surface with a second fastening element located thereon. Through the foregoing structure the front lid can be flipped outwards for 360 degrees and coupled through the first and second fastening elements. The support leg can be expanded to hold the screen to facilitate user viewing.

The first and second fastening elements are magnetic elements that attract each other to form desired fastening, and also can be held inside the front and rear lids in a concealed manner.

The first and second fastening elements can also be snap buttons that can be coupled together by snapping.

The support leg includes:
a support plate with one end connected to the rear lid and a slot formed thereon; and
an extension plate with one end connected to an edge of the slot and another end connected to the rear lid and a folding portion in the middle so that it can be extended to form a braced and fixed position.

The rear lid also has an anchor portion corresponding to the folding position of the support leg to hold the support leg at the folding condition.

The rear lid further may have two support legs on the inner surface. One of the support legs is located at a transverse position to provide a transverse angle, and another support leg is located at a longitudinal position to provide a longitudinal angle.

The aforesaid support leg may include two sets to provide two transverse angles.

The aforesaid support leg may also include two sets to provide two longitudinal angles.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 10 is a perspective view of the invention in a folding condition.

DESCRIPTION OF THE PREFERRED EMBODIMENTS

Figure 1:
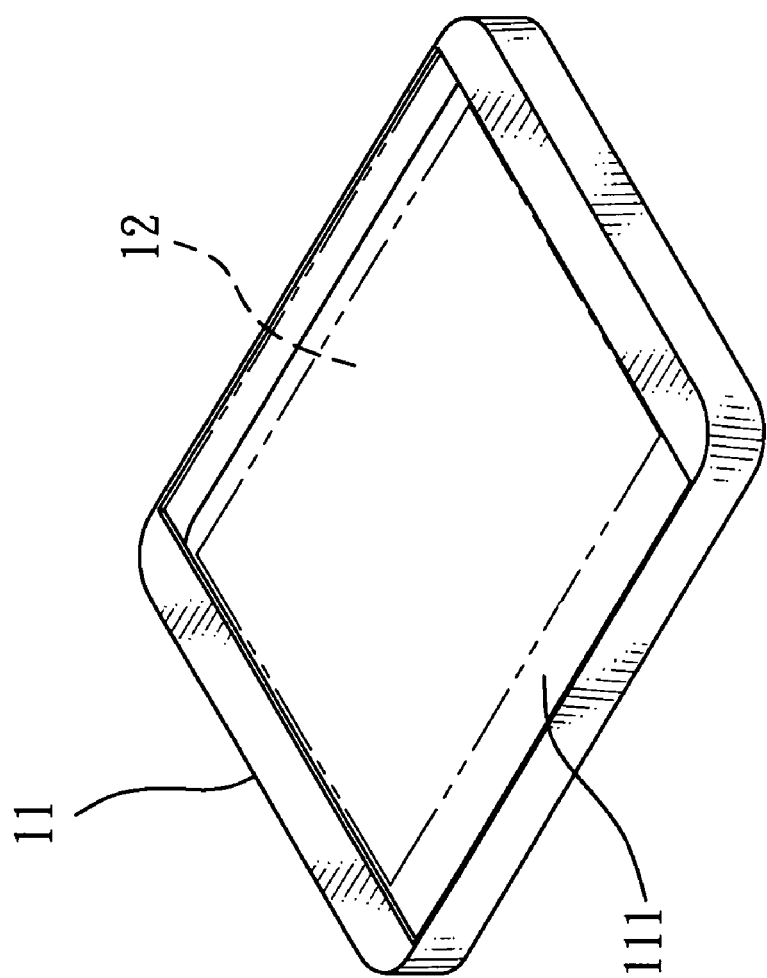
FIG. 1 is a schematic view of a conventional protective cover.
Figure 2:
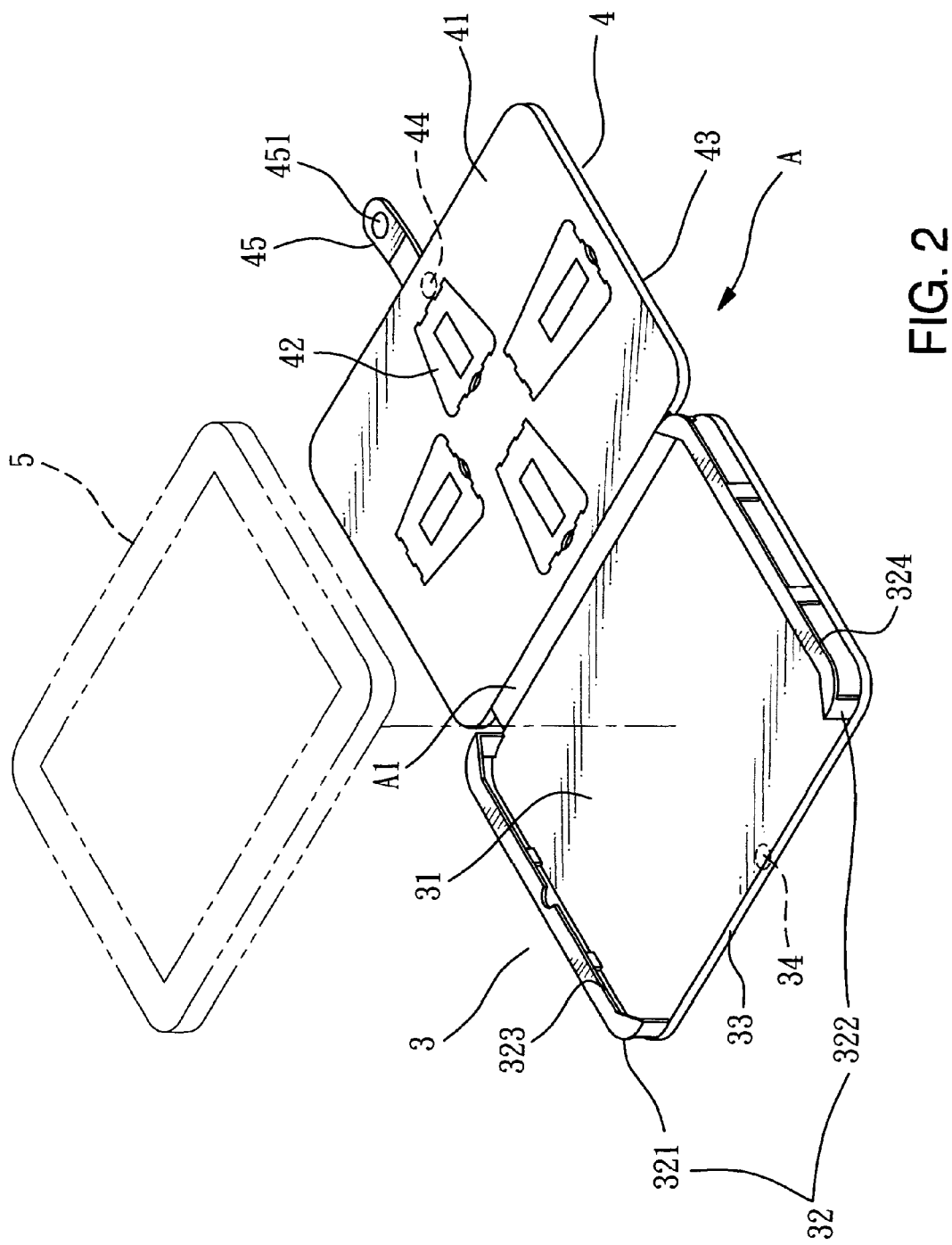
FIG. 2 is a perspective view of the invention.
Figure 3:
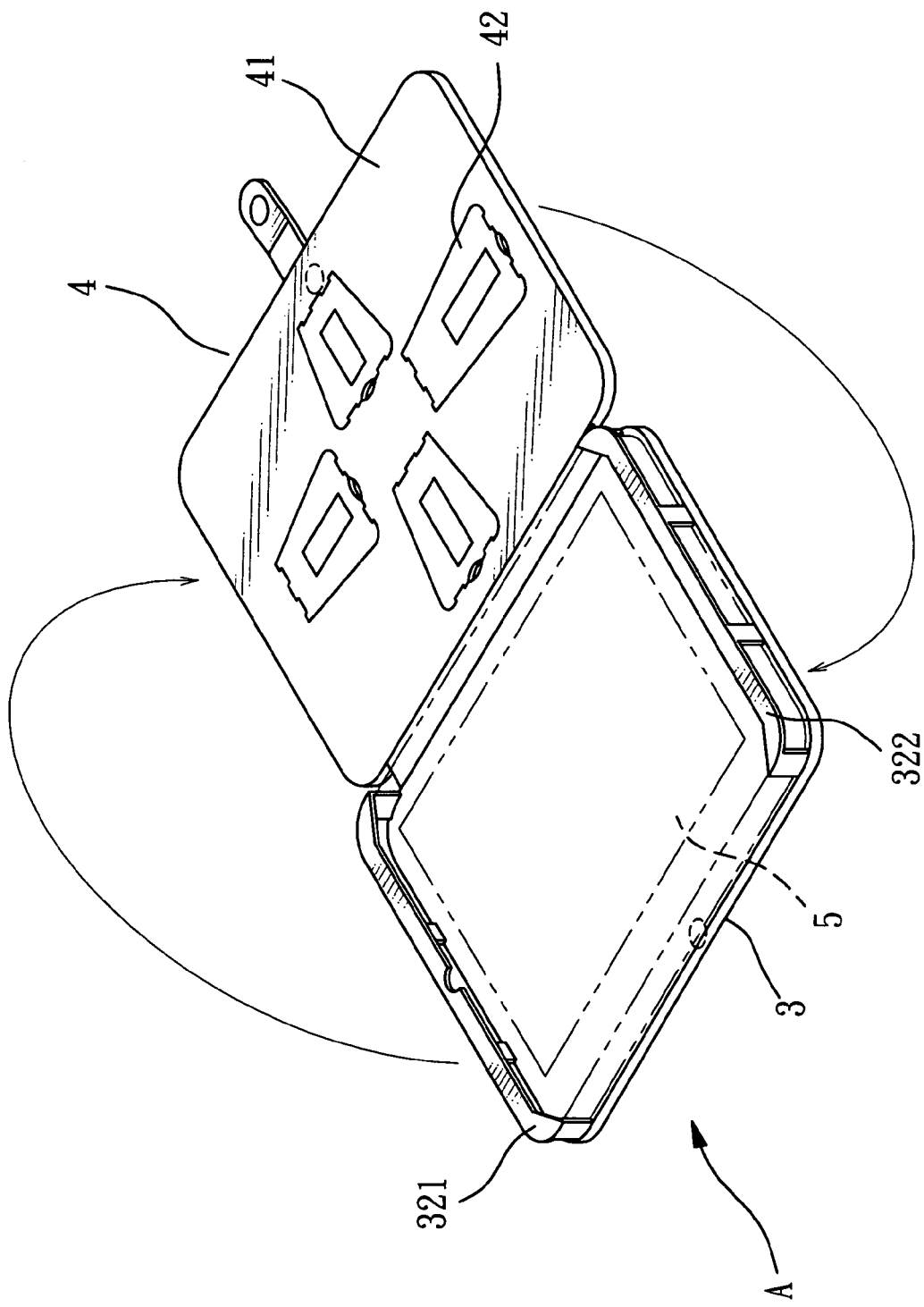
FIG. 3 is a perspective view of an embodiment of the invention.

Please referring to FIG. 2, the present invention aims to provide a protective cover A for a portable electronic device. It includes a front lid 3 and a rear lid 4 coupled together through a fastening portion A1 which allows the front lid 3 and rear lid 4 to face each other for folding or be flipped against each other outwards so that the surfaces of an outer side 33 of the front lid 3 and an outer surface 43 of the rear lid 4 can form an encasing cover.

The front lid 3 also has an inner side 31 with a holding means 32 located thereon to hold an electronic device 5. The holding means 32 includes an upper holding portion 321 and a lower holding portion 322 that have respectively an upper edge 323 and a lower edge 324 to surround and confine the upper side and lower side of the body of the electronic device 5. The front lid 3 also has a first fastening element 34 on the outer side 33.

Figure 5:
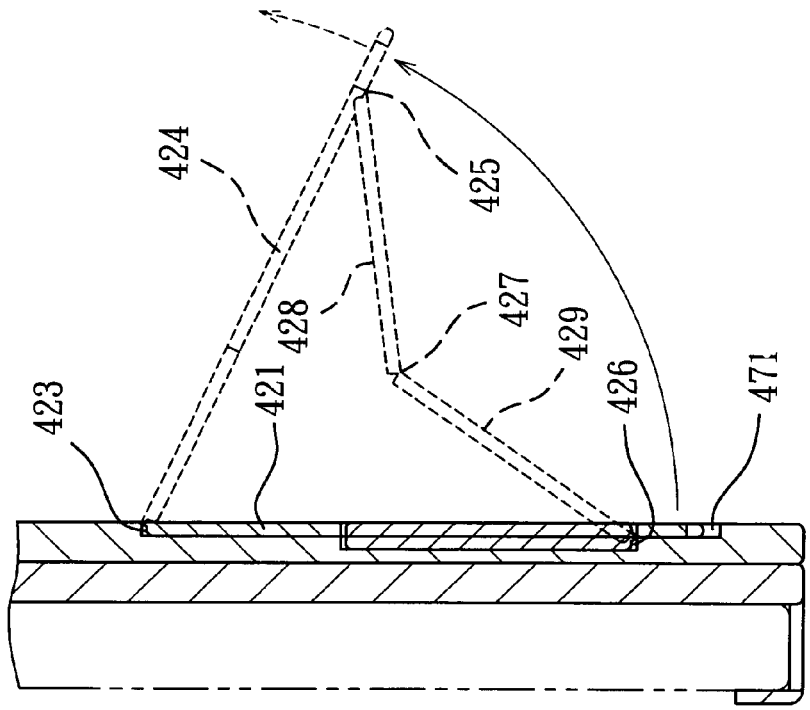
FIG. 5 is a schematic view of the invention in a use condition.
Figure 6:
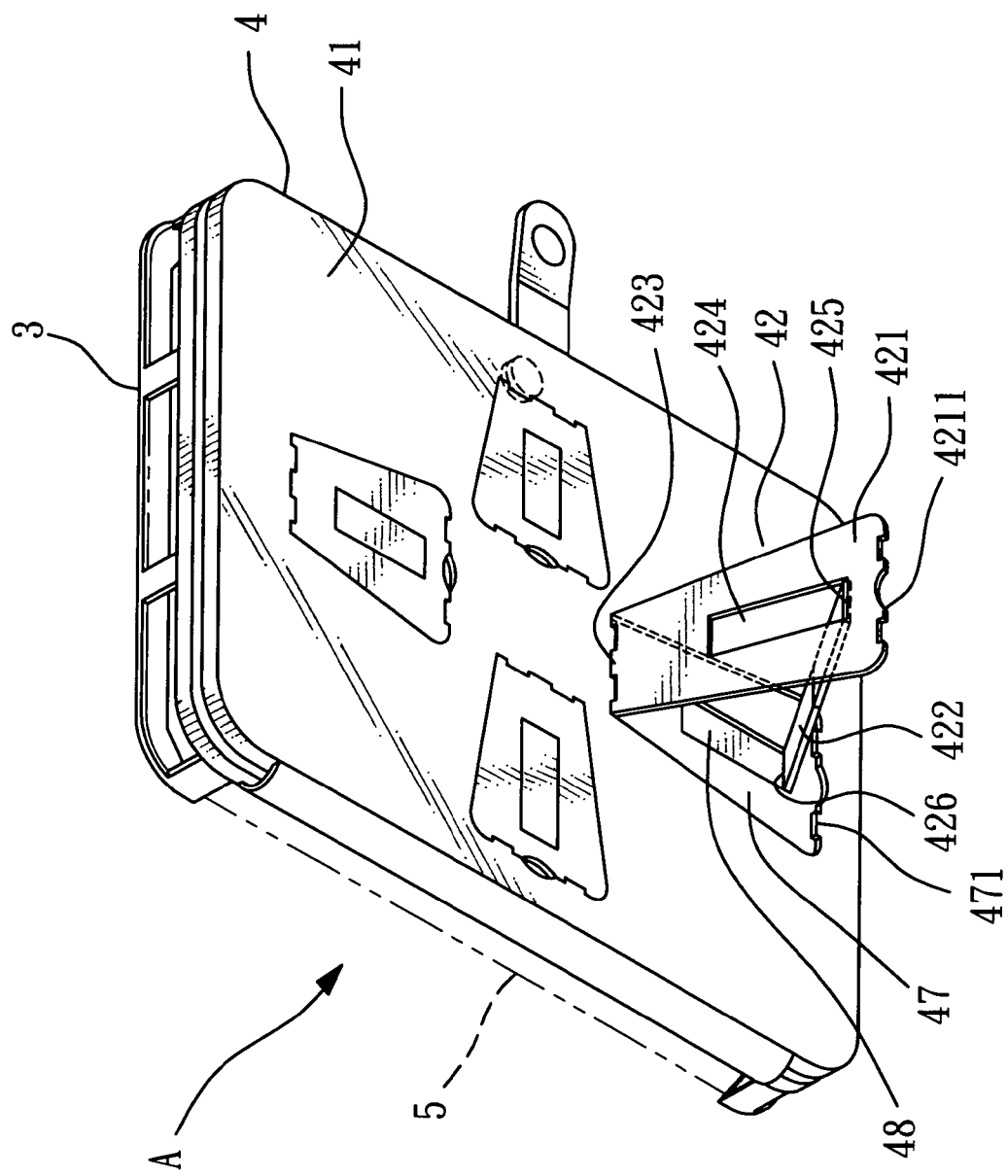
FIG. 6 is a schematic view of the invention in a longitudinal standing condition.
Figure 7:
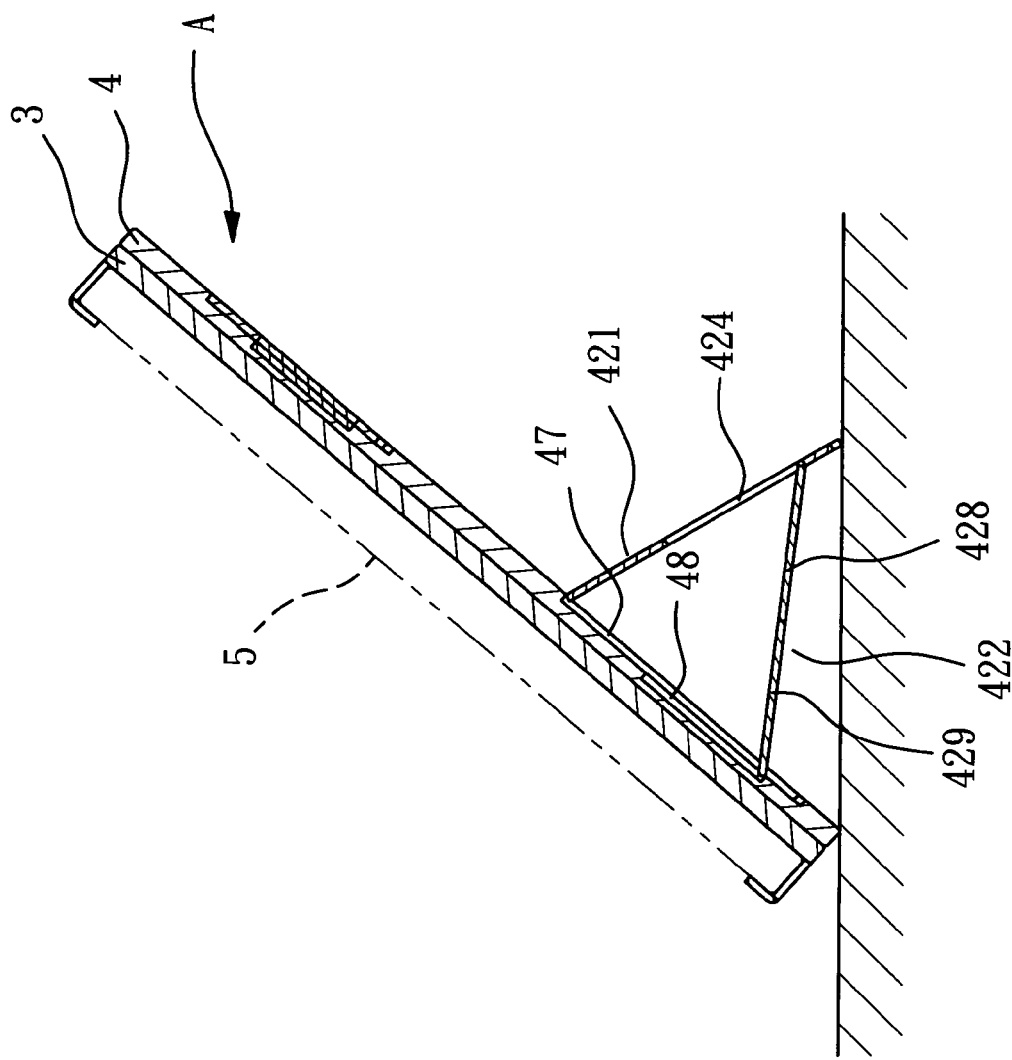
FIG. 7 is a sectional view of the invention in a longitudinal standing condition.

The read lid 4 has an inner surface 41 with at least one support leg 42 located thereon and a first holding trough 47 (also referring to FIGS. 5, 6 and 7) corresponding to the support leg 42, and a second holding trough 48 indented from the first holding trough 47. The outer surface 43 of the rear lid 4 has a second fastening element 44 located thereon corresponding to the first fastening element 34 to couple with each other.

The support leg 42 includes:
a support plate 421 with one end 423 connected to one edge of the first holding trough 47 and a slot 424 formed thereon; and
an extension plate 422 with one end 425 connected to an edge of the slot 424 and another end 426 connected to one edge of the second holding trough 48, and a folding portion 427 in the middle so that it can be extended to brace the support leg 42 in a fixed manner.

The first and second fastening elements 34 and 44 are magnetic elements that attract each other to form desired fastening, and also can be held inside the front lid 3 and rear lid 4 in a concealed manner.

The first and second fastening elements 34 and 44 can also be snap buttons that can be coupled together by snapping.

In addition, the rear lid 4 also has a holding band 45 at one side with a third fastening element 451 located thereon to wind around the outer side 33 of the front lid 3 when it is folded over the rear lid 4 to snap (or be magnetically attracted) to the first fastening element 33 on the outer side 33. The third fastening element 451 may also be a snap button or a magnetic element.

Figure 4:
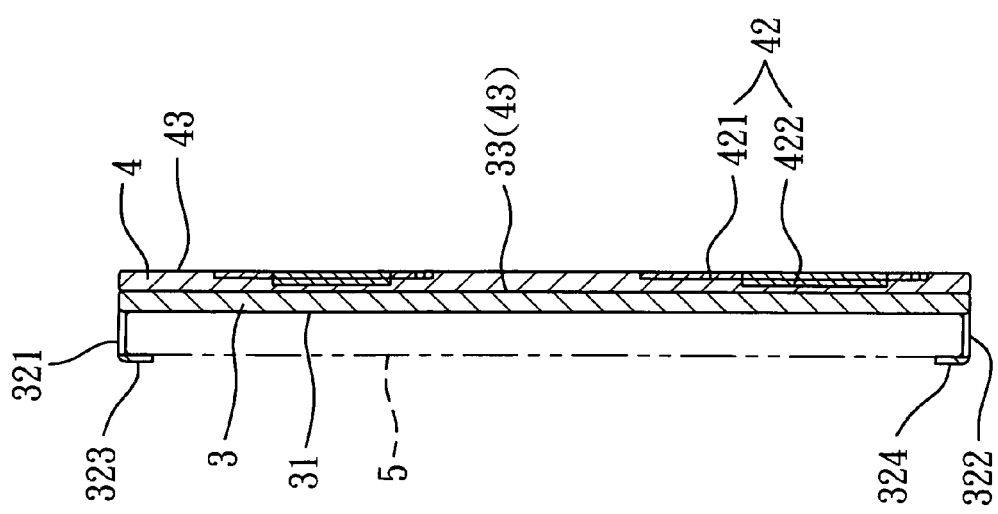
FIG. 4 is a sectional view of the invention.

When in use to hold the electronic device 5 for a user to look at the screen, first, place the electronic device 5 on the front lid 3 and wedge in the upper and lower edges 323 and 324 of the upper and lower holding portions 321 and 322 to be held securely; next, flip the front lid 3 for 360 degrees to make the outer side 33 facing the outer surface 43 of the rear lid 4; couple the first fastening element 34 with the second fastening element 44 by snapping (or magnetic attraction); depending on viewing direction, select and flip the support leg 42 at a corresponding location, such as flip the support leg 42 at the longitudinal angle for viewing longitudinally (referring to FIGS. 4, 5 and 6), by flipping the support plate 421 outwards about the folding portion 427, the upper half section 428 and lower half section 429 of the extension plate 422 can be moved out from the slot 424 and second holding trough 48 until the upper half section 428 and lower half section 429 form a straight line to make the support leg 42 at the most desirable expanded position (referring to FIG. 7), thereby to support the protective cover A at a standing position.

Figure 8:
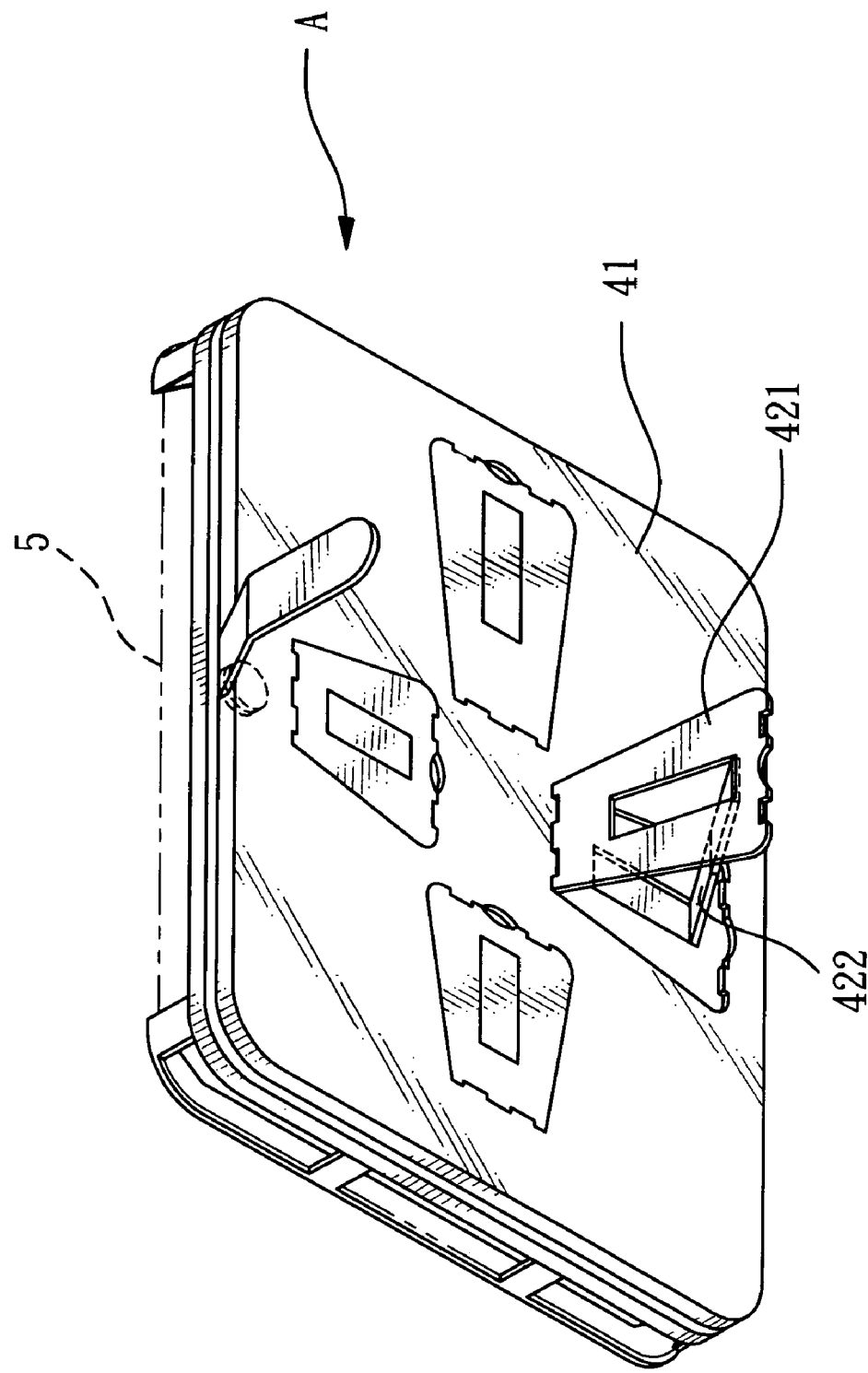
FIG. 8 is a schematic view of the invention in a transverse standing condition.
Figure 9:
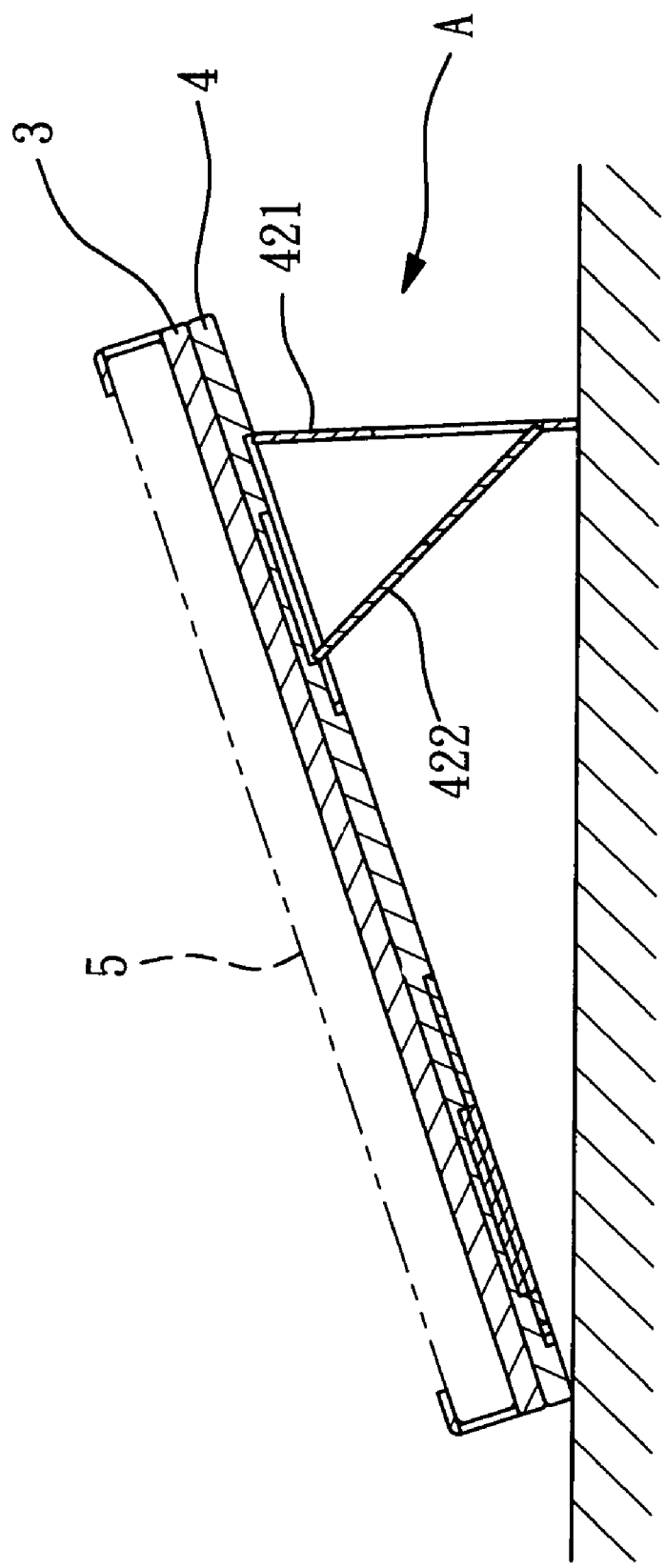
FIG. 9 is a sectional view of the invention in a transverse standing condition.

Refer to FIGS. 8 and 9 for an embodiment in a transverse viewing condition. Flip the support leg 42 at the transverse angle to see the screen transversely. The invention also is adaptable for viewing in all directions. To meet this end two transverse support legs 42 and two other longitudinal support legs 42 are provided on the inner surface 41 of the rear lid 4, namely each direction of up, down, left and right has one corresponding support leg 42 to achieve such purpose.

Referring to FIG. 10, when the electronic device 5 is not in use, fold the front lid 3 over the rear lid 4 with the inner side 31 facing the inner surface 41, and wind the holding band 45 of the third fastening element 451 around to snap (or be magnetically attracted) to the first fastening element 34; then fold the support plate 421 inwards and move the upper half section 428 of the extension plate 422 in the slot 424, and move the lower half section 429 into the second holding trough 48, the support plate 421 also can be retracted into the first holding trough 47; the first holding trough 47 has an anchor portion 471 at the bottom edge to latch the bottom side 4211 of the support plate 421 to prevent the support leg 42 from escaping the first holding trough 47.

I claim:

1. A protective cover for portable electronic devices, comprising a front lid and a rear lid coupled together; wherein:
    the front lid includes a holding means on an inner side to hold an electronic device and a first fastening element on an outer side thereof; and
    the rear lid includes two support legs on an inner surface and a second fastening element on an outer surface thereof corresponding to the first fastening element to form coupling therewith; one support leg being located transversely on the inner surface to provide a transverse angle and another support leg being located longitudinally on the inner surface to provide a longitudinal angle;
    wherein the front lid is flappable outwards for 360 degrees when in use and the first fastening element and the second fastening element are fastenable together, and the support legs are expandable to facilitate user's viewing of a screen of the electronic device.

2. The protective cover for portable electronic devices of claim 1, wherein each support leg includes:
    a support plate which has one end connected to one edge of a first holding trough formed on the rear lid and a slot formed thereon; and
    an extension plate which has one end connected to an edge of the slot and another end connected to one edge of a second holding trough formed on the rear lid, and a folding portion in the middle thereof so that the extension plate is extendable to brace the support leg at a fixed position.

3. The protective cover for portable electronic devices of claim 1, wherein the first fastening element and the second fastening element are magnetic elements attractable to each other for fastening.

4. The protective cover for portable electronic devices of claim 1, wherein the first fastening element and the second fastening element are snap buttons that are couplable together by snapping.

5. The protective cover for portable electronic devices of claim 1, wherein the rear lid further includes a holding band on a lateral side that has a third fastening element located thereon.

6. The protective cover for portable electronics devices of claim 1, wherein the two support legs are positioned to provide two transverse angles.

7. The protective cover for portable electronic devices of claim 1, wherein the two support legs are positioned to provide two longitudinal angles.

8. The protective cover for portable electronic devices of claim 1, wherein the holding means includes an upper holding portion and a lower holding portion that have circumferences to surround and hold a body of the electronic device.

9. The protective cover for portable electronic devices of claim 1, wherein the first fastening element and the second fastening element are located respectively inside the front lid and the rear lid.

* * * * *